US008990536B2

(12) United States Patent
White

(10) Patent No.: US 8,990,536 B2
(45) Date of Patent: Mar. 24, 2015

(54) SYSTEMS AND METHODS FOR JOURNALING AND EXECUTING DEVICE CONTROL INSTRUCTIONS

(75) Inventor: Sean White, Charlestown, RI (US)

(73) Assignee: Schneider Electric IT Corporation, West Kingston, RI (US)

( * ) Notice: Subject to any disclaimer, the term of this patent is extended or adjusted under 35 U.S.C. 154(b) by 30 days.

(21) Appl. No.: 13/150,487

(22) Filed: Jun. 1, 2011

(65) Prior Publication Data

US 2012/0311290 A1    Dec. 6, 2012

(51) Int. Cl.
G06F 12/02      (2006.01)
G06F 9/455      (2006.01)

(52) U.S. Cl.
CPC ...................................... G06F 9/455 (2013.01)
USPC ................... 711/170; 711/103; 711/E12.001; 711/E12.002; 711/E12.008

(58) Field of Classification Search
CPC .................... G06F 12/0246; G06F 2212/7207; G06F 2212/7208; G06F 1/3209; G06F 1/3212; G06F 2201/865; G06F 11/2069; G06F 11/008; G06F 11/1435; G06F 11/2089; G06F 11/34; G06F 11/1471; G06F 11/1446; G06F 15/177; G06F 17/30067; G06F 17/30073; G06F 17/3028; G06F 3/0614; G06F 3/0619; G06F 3/0643; G06F 8/65
USPC ................... 711/170, E12.008, 103, E12.059, 711/E12.001, E12.002, E12.103, 162, 161, 711/165
See application file for complete search history.

(56) References Cited

U.S. PATENT DOCUMENTS

| | | | |
|---|---|---|---|
| 3,810,138 | A | 5/1974 | Thompson et al. |
| 4,349,879 | A | 9/1982 | Peddie et al. |
| 4,521,645 | A | 6/1985 | Carroll |
| 4,535,598 | A | 8/1985 | Mount |
| 4,568,934 | A | 2/1986 | Allgood |
| 4,636,652 | A | 1/1987 | Raes |

(Continued)

FOREIGN PATENT DOCUMENTS

| | | |
|---|---|---|
| CA | 2300053 A1 | 2/1999 |
| CA | 2310275 A1 | 6/1999 |

(Continued)

OTHER PUBLICATIONS

Axis Communications, "Axis 200+ and 240 Camera Server: User's Guide", www.axis.com/techsup/cam.sub.--servers/cam.sub.--240/index.htm, pp. 1-38, Jan. 1999.
Axis Communications, "Axis 2400/2401 Administration Manual Version 1.1", www.axis.com/techsup/cam.sub.--2400/index.htm, version 1.1xx, part No. 16741, pp. 1-78, Jul. 1999. cited by other.

(Continued)

Primary Examiner — Yaima Rigol
Assistant Examiner — Edward Waddy, Jr.
(74) Attorney, Agent, or Firm — Lando & Anastasi, LLP

(57) ABSTRACT

A constrained computing device is provided. The constrained computing device includes a memory, a processor coupled to the memory, and a journaling component executed by the processor in kernel mode. The journaling component is configured to receive information descriptive of a device control, allocate, in the memory, a variable record structured according to a variable definition associated with the device control, store the information within the variable record, receive updated information descriptive of the device control, allocate, in the memory, an update record structured according to an update variable definition, store the updated information within the update record, and link the variable record to the update record.

17 Claims, 8 Drawing Sheets

(56) References Cited

U.S. PATENT DOCUMENTS

| | | |
|---|---|---|
| 4,637,020 A | 1/1987 | Schinabeck |
| 4,650,347 A | 3/1987 | Shigemura et al. |
| 4,668,939 A | 5/1987 | Kimura et al. |
| 4,718,025 A | 1/1988 | Minor et al. |
| 4,747,041 A | 5/1988 | Engel et al. |
| 4,751,648 A | 6/1988 | Sears, III et al. |
| 4,816,208 A | 3/1989 | Woods et al. |
| 4,823,290 A | 4/1989 | Fasack et al. |
| 4,964,065 A | 10/1990 | Hicks et al. |
| 5,043,807 A | 8/1991 | Rabii |
| 5,061,916 A | 10/1991 | French et al. |
| 5,086,385 A | 2/1992 | Launey et al. |
| 5,097,328 A | 3/1992 | Boyette |
| 5,109,278 A | 4/1992 | Erickson et al. |
| 5,153,837 A | 10/1992 | Shaffer et al. |
| 5,157,732 A | 10/1992 | Ishii et al. |
| 5,189,394 A | 2/1993 | Walter et al. |
| 5,216,623 A | 6/1993 | Barrett et al. |
| 5,220,522 A | 6/1993 | Wilson et al. |
| 5,225,997 A | 7/1993 | Lederer et al. |
| 5,229,850 A | 7/1993 | Toyoshima |
| 5,262,758 A | 11/1993 | Nam et al. |
| 5,289,275 A | 2/1994 | Ishii et al. |
| 5,367,670 A | 11/1994 | Ward et al. |
| 5,382,943 A | 1/1995 | Tanaka |
| 5,395,042 A | 3/1995 | Riley et al. |
| 5,400,246 A | 3/1995 | Wilson et al. |
| 5,404,136 A | 4/1995 | Marsden |
| 5,475,364 A | 12/1995 | Kenet |
| 5,488,430 A | 1/1996 | Hong |
| 5,491,511 A | 2/1996 | Odle |
| 5,508,941 A | 4/1996 | Leplingard et al. |
| 5,528,507 A | 6/1996 | McNamara et al. |
| 5,548,659 A | 8/1996 | Okamoto |
| 5,553,609 A | 9/1996 | Chen et al. |
| 5,561,476 A | 10/1996 | Kershaw et al. |
| 5,566,339 A | 10/1996 | Perholtz et al. |
| 5,572,195 A | 11/1996 | Heller et al. |
| 5,581,478 A | 12/1996 | Cruse et al. |
| 5,586,202 A | 12/1996 | Ohki et al. |
| 5,588,067 A | 12/1996 | Peterson et al. |
| 5,589,764 A | 12/1996 | Lee |
| 5,602,585 A | 2/1997 | Dickinson et al. |
| 5,621,662 A | 4/1997 | Humphries et al. |
| 5,634,002 A | 5/1997 | Polk et al. |
| 5,659,470 A | 8/1997 | Goska et al. |
| 5,664,202 A | 9/1997 | Chen et al. |
| 5,715,160 A | 2/1998 | Plotke |
| 5,731,832 A | 3/1998 | Ng |
| 5,732,074 A | 3/1998 | Spaur et al. |
| 5,742,762 A | 4/1998 | Scholl et al. |
| RE35,793 E | 5/1998 | Halpern |
| 5,768,430 A | 6/1998 | Takashima et al. |
| 5,778,168 A | 7/1998 | Fuller |
| 5,798,798 A | 8/1998 | Rector et al. |
| 5,805,458 A | 9/1998 | McNamara et al. |
| 5,812,055 A | 9/1998 | Candy et al. |
| 5,818,725 A | 10/1998 | McNamara et al. |
| 5,822,302 A | 10/1998 | Scheetz et al. |
| 5,826,253 A | 10/1998 | Bredenberg |
| 5,829,130 A | 11/1998 | Miller |
| 5,870,575 A | 2/1999 | Kahle et al. |
| 5,892,440 A | 4/1999 | Bryan |
| 5,905,867 A | 5/1999 | Giorgio |
| 5,926,210 A | 7/1999 | Hackett et al. |
| 5,937,092 A | 8/1999 | Wootton et al. |
| 5,937,097 A | 8/1999 | Lennon |
| 5,949,974 A | 9/1999 | Ewing et al. |
| 5,955,946 A | 9/1999 | Beheshti et al. |
| 5,963,457 A | 10/1999 | Kanoi et al. |
| 5,968,116 A | 10/1999 | Day, II et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,987,614 A | 11/1999 | Mitchell et al. |
| 5,991,775 A | 11/1999 | Beardsley et al. |
| 5,991,885 A | 11/1999 | Chang et al. |
| 6,001,065 A | 12/1999 | DeVito |
| 6,052,750 A | 4/2000 | Lea |
| 6,055,480 A | 4/2000 | Nevo et al. |
| 6,057,834 A | 5/2000 | Pickover |
| 6,058,434 A | 5/2000 | Wilt et al. |
| 6,078,253 A | 6/2000 | Fowler |
| 6,081,606 A | 6/2000 | Hansen et al. |
| 6,085,243 A | 7/2000 | Fletcher et al. |
| 6,088,816 A | 7/2000 | Nouri et al. |
| 6,094,676 A | 7/2000 | Gray et al. |
| 6,100,806 A | 8/2000 | Gaukel |
| 6,104,755 A | 8/2000 | Ohara |
| 6,105,061 A | 8/2000 | Nakai |
| 6,108,782 A | 8/2000 | Fletcher et al. |
| 6,112,235 A | 8/2000 | Spofford |
| 6,115,468 A | 9/2000 | De Nicolo |
| 6,122,603 A | 9/2000 | Budike, Jr. |
| 6,125,145 A | 9/2000 | Koyanagi et al. |
| 6,138,078 A | 10/2000 | Canada et al. |
| 6,138,249 A | 10/2000 | Nolet |
| 6,139,177 A | 10/2000 | Venkatraman et al. |
| 6,144,770 A | 11/2000 | Lennon |
| 6,148,262 A | 11/2000 | Fry |
| 6,157,943 A | 12/2000 | Meyer |
| 6,160,584 A | 12/2000 | Yanagita |
| 6,160,926 A | 12/2000 | Dow et al. |
| 6,167,406 A | 12/2000 | Hoskins et al. |
| 6,170,007 B1 | 1/2001 | Venkatraman et al. |
| 6,173,323 B1 | 1/2001 | Moghe |
| 6,175,866 B1 | 1/2001 | Holloway et al. |
| 6,175,927 B1 | 1/2001 | Cromer et al. |
| 6,177,884 B1 | 1/2001 | Hunt et al. |
| 6,182,094 B1 | 1/2001 | Humpleman et al. |
| 6,182,157 B1 | 1/2001 | Schlener et al. |
| 6,189,109 B1 | 2/2001 | Sheikh et al. |
| 6,195,018 B1 | 2/2001 | Ragle et al. |
| 6,208,261 B1 | 3/2001 | Olstead |
| 6,208,345 B1 | 3/2001 | Sheard et al. |
| 6,215,404 B1 | 4/2001 | Morales |
| 6,219,628 B1 | 4/2001 | Kodosky et al. |
| 6,229,429 B1 | 5/2001 | Horon |
| 6,236,332 B1 | 5/2001 | Conkright et al. |
| 6,246,780 B1 | 6/2001 | Sato |
| 6,259,956 B1 | 7/2001 | Myers et al. |
| 6,266,721 B1 | 7/2001 | Sheikh et al. |
| 6,271,845 B1 | 8/2001 | Richardson |
| 6,281,790 B1 | 8/2001 | Kimmel et al. |
| 6,282,546 B1 | 8/2001 | Gleichauf et al. |
| 6,298,144 B1 | 10/2001 | Pucker, II et al. |
| 6,304,900 B1 | 10/2001 | Cromer et al. |
| 6,311,105 B1 | 10/2001 | Budike, Jr. |
| 6,311,214 B1 | 10/2001 | Rhoads |
| 6,324,644 B1 | 11/2001 | Rakavy et al. |
| 6,324,654 B1 | 11/2001 | Wahl et al. |
| 6,329,792 B1 | 12/2001 | Dunn et al. |
| 6,332,202 B1 | 12/2001 | Sheikh et al. |
| 6,336,175 B1 | 1/2002 | Shaath et al. |
| 6,338,094 B1 | 1/2002 | Scott et al. |
| 6,353,834 B1 | 3/2002 | Wong et al. |
| 6,360,255 B1 | 3/2002 | McCormack et al. |
| 6,363,421 B2 | 3/2002 | Barker et al. |
| 6,363,422 B1 | 3/2002 | Hunter et al. |
| 6,373,840 B1 | 4/2002 | Chen |
| 6,374,296 B1 | 4/2002 | Lim et al. |
| 6,375,614 B1 | 4/2002 | Braun et al. |
| 6,381,700 B1 | 4/2002 | Yoshida |
| 6,389,464 B1 | 5/2002 | Krishnamurthy et al. |
| 6,396,534 B1 | 5/2002 | Mahler et al. |
| 6,400,103 B1 | 6/2002 | Adamson |
| 6,400,996 B1 | 6/2002 | Hoffberg et al. |
| 6,402,691 B1 | 6/2002 | Peddicord et al. |
| 6,404,348 B1 | 6/2002 | Wilfong |
| 6,405,216 B1 | 6/2002 | Minnaert et al. |
| 6,421,690 B1 | 7/2002 | Kirk, III |
| 6,442,706 B1 | 8/2002 | Wahl et al. |
| 6,449,745 B1 | 9/2002 | Kim et al. |
| 6,477,667 B1 | 11/2002 | Levi et al. |

(56) References Cited

U.S. PATENT DOCUMENTS

| | | |
|---|---|---|
| 6,496,105 B2 | 12/2002 | Fisher et al. |
| 6,496,858 B1 | 12/2002 | Frailong et al. |
| 6,505,086 B1 | 1/2003 | Dodd, Jr. et al. |
| 6,510,350 B1 | 1/2003 | Steen, III et al. |
| 6,529,230 B1 | 3/2003 | Chong |
| 6,529,936 B1 | 3/2003 | Mayo et al. |
| 6,553,336 B1 | 4/2003 | Johnson et al. |
| 6,553,418 B1 | 4/2003 | Collins et al. |
| 6,591,279 B1 | 7/2003 | Emens et al. |
| 6,640,145 B2 | 10/2003 | Hoffberg et al. |
| 6,681,787 B2 | 1/2004 | Tinsley et al. |
| 6,714,977 B1 | 3/2004 | Fowler et al. |
| 6,754,657 B2 | 6/2004 | Lomet |
| 6,754,743 B2 | 6/2004 | Maessen |
| 6,769,124 B1 * | 7/2004 | Schoening et al. ............ 719/316 |
| 6,990,513 B2 | 1/2006 | Belfiore et al. |
| 7,010,662 B2 | 3/2006 | Aasheim et al. |
| 7,051,096 B1 | 5/2006 | Krawiec et al. |
| 7,207,041 B2 | 4/2007 | Elson et al. |
| 7,415,691 B2 * | 8/2008 | Andreev et al. ............... 716/101 |
| 7,542,963 B2 * | 6/2009 | Primm ................................ 1/1 |
| 7,743,214 B2 * | 6/2010 | Adams et al. ................. 711/117 |
| 2001/0005894 A1 | 6/2001 | Fukui |
| 2001/0047213 A1 | 11/2001 | Sepe |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0003575 A1 | 1/2002 | Marchese |
| 2002/0023258 A1 | 2/2002 | Elwahab et al. |
| 2002/0041603 A1 | 4/2002 | Kato |
| 2002/0043969 A1 | 4/2002 | Duncan et al. |
| 2002/0071031 A1 | 6/2002 | Lord et al. |
| 2002/0072868 A1 | 6/2002 | Bartone et al. |
| 2002/0083378 A1 | 6/2002 | Nickels |
| 2002/0120811 A1 * | 8/2002 | Maeda .......................... 711/105 |
| 2002/0152298 A1 | 10/2002 | Kikta et al. |
| 2003/0098789 A1 | 5/2003 | Murakami et al. |
| 2003/0099254 A1 | 5/2003 | Richter |
| 2004/0236718 A1 | 11/2004 | Primm |
| 2005/0144352 A1 * | 6/2005 | Wu et al. ....................... 711/100 |
| 2009/0031083 A1 * | 1/2009 | Willis et al. ................... 711/135 |
| 2009/0069905 A1 * | 3/2009 | Diezel et al. ..................... 700/32 |
| 2009/0172273 A1 | 7/2009 | Piszczek et al. |
| 2009/0265511 A1 * | 10/2009 | Fujita et al. ................... 711/114 |
| 2009/0307290 A1 | 12/2009 | Barsness et al. |
| 2011/0302377 A1 * | 12/2011 | Elko et al. ..................... 711/152 |

FOREIGN PATENT DOCUMENTS

| | | |
|---|---|---|
| CA | 2328939 A1 | 9/1999 |
| CN | 87100353 A | 9/1988 |
| CN | 1294350 A | 5/2001 |
| EP | 0 591 585 B1 | 4/1994 |
| EP | 0444997 B1 | 2/1995 |
| EP | 0738065 A1 | 10/1996 |
| EP | 0859489 A2 | 8/1998 |
| EP | 0917034 A1 | 5/1999 |
| EP | 0 927 933 A2 | 7/1999 |
| EP | 0964551 A1 | 12/1999 |
| EP | 0977112 A2 | 2/2000 |
| EP | 0978780 A1 | 2/2000 |
| EP | 0990986 A2 | 4/2000 |
| EP | 0992100 A2 | 4/2000 |
| EP | 1002268 A1 | 5/2000 |
| EP | 1 009 130 A1 | 6/2000 |
| EP | 1014622 A2 | 6/2000 |
| EP | 1032884 A1 | 9/2000 |
| EP | 1 049 291 A2 | 11/2000 |
| EP | 1 096 724 A1 | 5/2001 |
| EP | 1115264 A2 | 7/2001 |
| EP | 1124301 A2 | 8/2001 |
| EP | 1 150 188 A2 | 10/2001 |
| EP | 1142289 A1 | 10/2001 |
| EP | 0963076 A2 | 11/2001 |
| EP | 1 178 628 A2 | 2/2002 |
| GB | 2335124 A | 9/1999 |
| GB | 2343036 A | 4/2000 |
| GB | 2344718 A | 6/2000 |
| GB | 2351205 A | 12/2000 |
| GB | 2355163 A | 4/2001 |
| GB | 2359369 A | 8/2001 |
| JP | 3099398 A | 4/1991 |
| JP | 5040889 A | 2/1993 |
| JP | 6105376 A | 4/1994 |
| JP | 6119581 A | 4/1994 |
| JP | 8307541 A | 11/1996 |
| JP | 11164035 A | 6/1999 |
| JP | 11219388 A | 8/1999 |
| JP | 2000092092 A | 3/2000 |
| JP | 2000134606 A | 5/2000 |
| JP | 2000151606 A | 5/2000 |
| JP | 2000209204 A | 7/2000 |
| JP | 2000278773 A | 10/2000 |
| TW | 0443058 B | 6/2001 |
| TW | 0448349 B | 8/2001 |
| WO | 95/21506 A2 | 8/1995 |
| WO | 96/15615 A1 | 5/1996 |
| WO | 97/30879 A1 | 8/1997 |
| WO | 98/01838 A1 | 1/1998 |
| WO | 98/26541 A1 | 6/1998 |
| WO | 99/01918 A1 | 1/1999 |
| WO | 99/08183 A1 | 2/1999 |
| WO | 9915950 A1 | 4/1999 |
| WO | 99/27456 A1 | 6/1999 |
| WO | 99/45445 A1 | 9/1999 |
| WO | 00/35177 A1 | 6/2000 |
| WO | 00/39724 A2 | 7/2000 |
| WO | 00/54557 A1 | 9/2000 |
| WO | 00/73866 A1 | 12/2000 |
| WO | 00/79500 A1 | 12/2000 |
| WO | 01/01366 A2 | 1/2001 |
| WO | 01/08396 A1 | 2/2001 |
| WO | 01/27763 A1 | 4/2001 |
| WO | 01/57477 A1 | 8/2001 |
| WO | 01/57631 A1 | 8/2001 |
| WO | 01/61665 A2 | 8/2001 |
| WO | 01/69405 A1 | 9/2001 |
| WO | 0169504 A2 | 9/2001 |
| WO | 01/79935 A1 | 10/2001 |
| WO | 01/82028 A2 | 11/2001 |
| WO | 01/93042 A2 | 12/2001 |
| WO | 01/93508 A1 | 12/2001 |
| WO | 01/97907 A2 | 12/2001 |
| WO | 01/99402 A2 | 12/2001 |
| WO | 02/01877 A1 | 1/2002 |
| WO | 02/11391 A2 | 2/2002 |
| WO | 0233980 A2 | 4/2002 |
| WO | 02/37280 A2 | 5/2002 |
| WO | 02/47044 A1 | 6/2002 |
| WO | 02/47369 A1 | 6/2002 |
| WO | 02/48830 A2 | 6/2002 |
| WO | 02/49285 A1 | 6/2002 |

OTHER PUBLICATIONS

Axis Communications, "Network Camera Developments Enable Live Web Imaging", Axis 2100 white paper, www.axis.com/products/videos/camera/domumentation.htm, pp. 1-12, Nov. 1999. cited by other.

Fossum, E.R., "CMOS Image Sensors: Electronic Camera-On-Chip", IEEE Transactions on Electron Devices, vol. 44, iss. 10, pp. 1689-1698, Oct. 1997.

International Search Report for PCT/US2012/040206 mailed Aug. 7, 2012.

Rajeev Rastogi et al. Improving Predictability of Transaction Execution Time in Real-time Databases. Pub. in Real-time systems, 19, 283-302(2002).

Sinetica Corp: "Netcom TH. Advanced SNMP Agent with Web Browser Support", Sinetica, UK, www.sinetica.co.uk, Apr. 2000, XP002160505, 2 pp.

Sinetica Corp: "Newsletter, Issue One 99", Sinetica, UK, www.sinetica.co.uk, Feb. 1999, XP002160504, 4 pp.

* cited by examiner

SYSTEMS AND METHODS FOR JOURNALING AND EXECUTING DEVICE CONTROL INSTRUCTIONS

BACKGROUND

1. Technical Field

The technical field relates generally to systems and methods for controlling device operation and, more particularly, to systems and methods for controlling execution of monitoring device operations within a resource-constrained computing environment.

2. Background Discussion

Monitoring and control systems are often engineered to tight technological and budgetary tolerances. For this reason, these systems typically have limited memory and processing capabilities. These constrained computing resources result in a number of implementation challenges. Often within these systems, data is collected and processed during interrupt processing on devices and is subject to very rapid change. In many cases, the timeliness of these changes is critical, and the duration of significant changes may be very short (milliseconds are not uncommon). As a result, a number of serious design problems emerge in such systems when collecting data, processing data and controlling device operations.

For example, constrained computing devices may have difficulty quickly and efficiently reporting new sensor readings to collection systems while executing control functions over monitored equipment. In addition, constrained computing devices may miss short-term (millisecond range) updates, which may be significant, and therefore fail to report value updates across a network. Furthermore, constrained computing devices may be unable to execute relatively slow running code, such as notification routines for sending data through e-mail or performance of interactive control operations. This is so because the constrained computing device may be unable to render a stable view of highly dynamic data, so that a set of related values can be reported or processed in a consistent state ("temporal integrity"). Also, constrained computing devices may have difficulty delivering multiple data values consistently to collection systems, so that processing code does not observe temporary data inconsistencies ("transactional integrity").

Many constrained computing devices write and rewrite single data structures, typically with some sort of semaphore or other mutual exclusion mechanism, and rely on frequent polling by data monitoring applications to observe problems or report changes. Other systems work on a process-on-update model, where the act of updating the data also includes immediately calling the necessary processing code, so that the data update is handled. However, this processing model limits how much processing can be done before another data update can be reported and handled.

Unfortunately, conventional data processing solutions, such as large scale database systems, are not suitable for limited resource monitoring and control systems for a number of reasons. First, they typically require large database applications, along with large amounts of file system based storage. Secondly, their client interfaces are exclusively user-mode as opposed to being useable by interrupt mode or kernel mode processing. Lastly, large scale database systems lack the real-time to near real-time responsiveness needed by monitoring and control systems for data update, data access and device control.

U.S. Pat. No. 7,542,963 discloses a sensor monitoring system that makes use of an in memory data journal for the purposes of collecting and processing sensor and configuration data changes within a constrained computing device. The implementation of the data journal enables the constrained computing device to efficiently operate as a data monitoring system that collects data from external devices via a network or hardware bus. It is with the data journal that large quantities of data updates can be processed without being missed by slow running components of the system. Collections of related updates can be processed without loss to either their temporal or transactional integrity.

SUMMARY

Device control operations compete for system resources. Within the context of a resource-constrained computing device, this competition can lead to undesirable results such as sluggish response to requests for changes in the operational state of a device and uncoordinated device operations. At least some aspects and embodiments disclosed herein utilize a data journal to manage resource contention between device control operations. In some embodiments, the data journal includes a data journaling component that maintains data structures within the data journal. In other embodiments, the data journal provides a new variable classification for device control, which directs and maintains the state of device control operations. When a control operation is to be initiated, an update to the applicable device control object is appended to the data journal by the data journaling component thereby making it available to the rest of the system. As the contextual view of the data model is maintained by the journaling component, and the control operation is realized as an update to the journal, other applications which comprise the system can react to this update in a timely fashion. This update mechanism has additional benefits which are described further below.

In one embodiment, control operations originate within a constrained computing device and flow to one or more managed devices that are monitored and controlled by the constrained computing device. In some embodiments, the control operations are provided via a network. In other embodiments, the control operations are provided via a hardware bus. The control operations provided in this manner may control any functionality offered by the managed devices. By employing these and other techniques, aspects and embodiments disclosed herein provide resource constrained computing devices the ability to accommodate relatively slow running code while maintaining mutual exclusion of shared data and transactional integrity of related collections of data.

According to another embodiment, a constrained computing device is provided. The constrained computing device includes a memory, a processor coupled to the memory, and a journaling component executed by the processor in kernel mode. The journaling component is configured to receive information descriptive of a device control, allocate, in the memory, a variable record structured according to a variable definition associated with the device control, store the information within the variable record, receive updated information descriptive of the device control, allocate, in the memory, an update record structured according to an update variable definition, store the updated information within the update record, and link the variable record to the update record.

In the constrained computing device, the journaling component may be further configured to receive environmental information descriptive of data received via a sensor, allocate, in the memory, a sensor variable record structured according to a sensor variable definition associated with the sensor, store the environmental information within the sensor variable record, receive updated environmental information descriptive of updated data received via the sensor, allocate, in the memory, a sensor update record structured according to a sensor update variable definition, store the updated environmental information within the sensor update record, and link the sensor variable record to the sensor update record. In some embodiments, the update variable definition includes a metadata variable definition. In other embodiments, the journaling component is configured to provide an interface to a user mode program. In one embodiment, the updated information is descriptive of a control operation executable by at least one of an uninterruptible power supply, a power distribution unit, or a rack data access device.

The constrained computing device may further include a device management component. In at least one embodiment, the device management component is configured to find the update record and issue an instruction to the device control to perform the control operation.

In some embodiments, the journaling component may be further configured to store the variable record and the update record in non-volatile data storage. In these embodiments, the journaling component is further configured to initialize a journal from the variable record the update record stored in the non-volatile data storage.

According to another embodiment, a method of using a computer-implemented journal to manage device control operation is provided. The method includes acts of receiving, by a computer operating in kernel mode, information descriptive of a device control, allocating, by the computer operating in kernel mode, a variable record structured according to a variable definition associated with the device control, storing, by the computer operating in kernel mode, the information within the variable record, receiving, by a computer operating in kernel mode, updated information descriptive of a device control, allocating, by the computer operating in kernel mode, an update record structured according to an update variable definition, storing, by the computer operating in kernel mode, the updated information within the update record, and linking, by the computer operating in kernel mode, the variable record to the update record.

The method may further include acts of receiving environmental information descriptive of data received via a sensor, allocating a sensor variable record structured according to a sensor variable definition associated with the sensor, storing the environmental information within the sensor variable record, receiving updated environmental information descriptive of updated data receive via the sensor, allocating a sensor update record structured according to a sensor update variable definition, storing the updated environmental information within the sensor update record, and linking the sensor variable record to the sensor update record. The act of allocating the update record may include an act of allocating a metadata record. Furthermore, the act of receiving the information may include an act of receiving the information from a program executing in user mode. Moreover, the act of receiving the updated information may include an act of receiving updated information that is descriptive of a control operation executable by at least one of an uninterruptible power supply, a power distribution unit, or a rack data access device.

The method may further include acts of finding the update record, and issuing an instruction to the device control to perform the control operation. Also, the method may further include an act of storing the variable record and the update record in non-volatile data storage. In at least one embodiment, the method further includes an act of initializing a journal from the variable record the update record stored in the non-volatile data storage.

According to another embodiment, a non-transitory computer readable medium is provided. The computer readable medium has stored sequences of instruction for managing device control operation using a journal implemented by a journaling component executing in kernel mode. The sequences of instruction including instructions that will cause at least one processor to receive, while operating in kernel mode, information descriptive of a device control, allocate, while operating in kernel mode, a variable record structured according to a variable definition associated with the device control, store, while operating in kernel mode, the information within the variable record, receive, while operating in kernel mode, updated information descriptive of a device control, allocate, while operating in kernel mode, an update record structured according to an update variable definition, store, while operating in kernel mode, the updated information within the update record, and link, while operating in kernel mode, the variable record to the update record.

Instructions stored on the computer readable medium may further instruct the at least one processor to receive environmental information descriptive of data received via a sensor, allocate a sensor variable record structured according to a sensor variable definition associated with the sensor, store the environmental information within the sensor update record, receive updated environmental information descriptive of data received via the sensor, allocate a sensor update record structured according to a sensor update variable definition, store the updated environmental information within the sensor update record, and link the sensor variable record to the sensor update record. Also, instructions stored on the computer readable medium may further instruct the at least one processor to receive updated information that is descriptive of a control operation executable by at least one of an uninterruptible power supply, a power distribution unit, or a rack data access device. Furthermore, instructions stored on the computer readable medium may further instruct the at least one processor to find the update record, and issue an instruction to the device control to perform the control operation.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example or embodiment disclosed herein may be combined with any other example or embodiment. References to "an example," "an embodiment," "some examples," "some embodiments," "an alternate example," "various embodiments," "one example," "at least one embodiment," "this and other examples" or the like are not necessarily mutually exclusive and are intended to indicate that a particular feature, structure, or characteristic described in connection with the example or embodiment may be included in at least one example or embodiment. The appearances of such terms herein are not necessarily all referring to the same example or embodiment. Furthermore, in the event of inconsistent usages of terms between this document and documents incorporated herein by reference, the term usage in the incorporated references is supplementary to that of this document; for irreconcilable inconsistencies, the term usage in this document controls.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
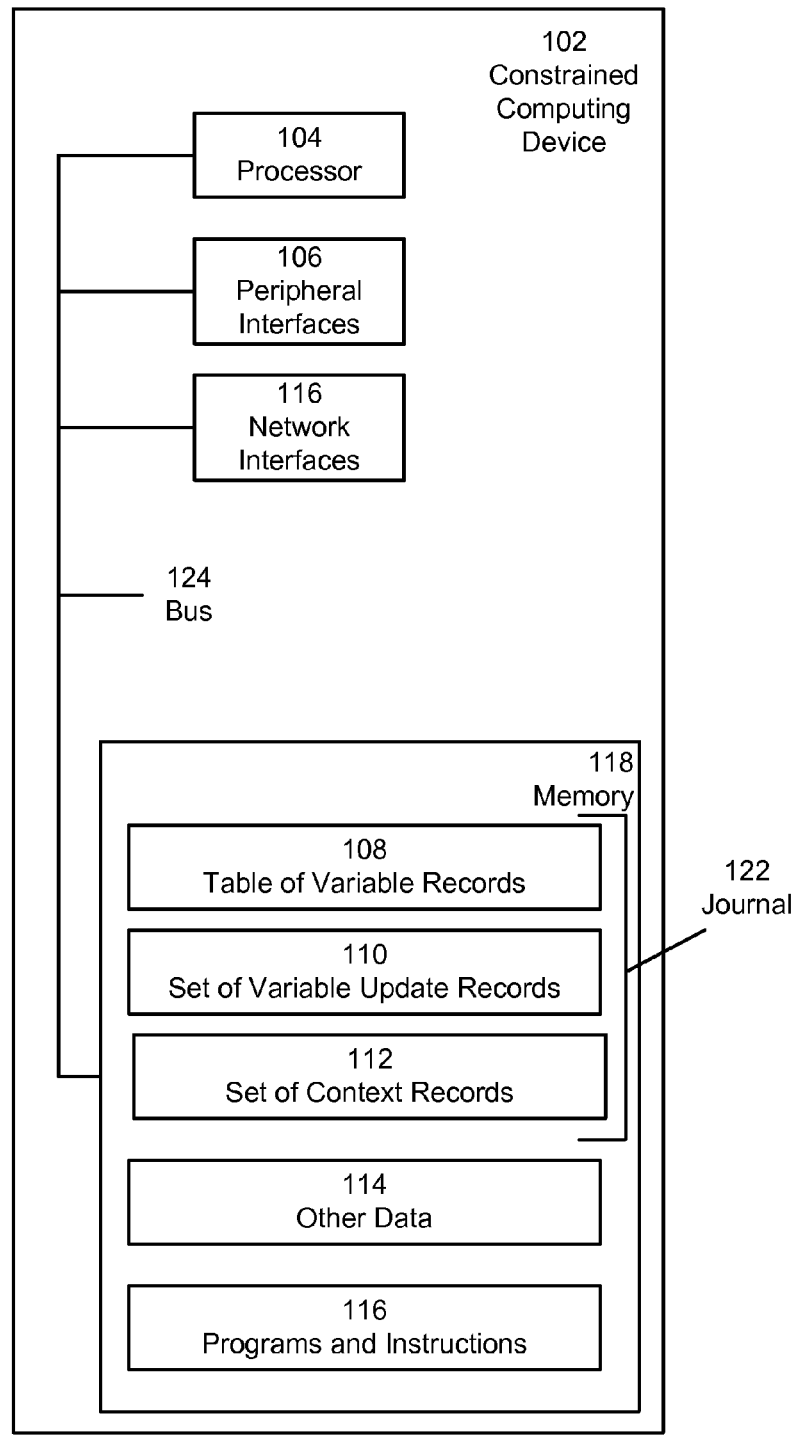
FIG. 1 is a schematic diagram of one example of a constrained computing device.

Aspects and embodiments disclosed herein provide processes and apparatus by which a constrained computing device monitors and controls the operations of various managed devices. For instance, at least one embodiment implements a data journal to record both sensor input received from a managed device and control instructions provided to the managed device for execution. The data journaling techniques described herein may be executed in real-time or near real-time by managed devices or by constrained computing devices that monitor and control the managed devices.

The managed devices discussed herein may include any device that controls provision of physical resources, such as power and cooling, and monitoring services, such as environmental and security monitoring, to equipment housed within a data center. Managed devices include enough computing resources to facilitate operation of the control device, but these computing resources are limited and tailored to support the operations performed by the control device. Examples of managed devices include smart uninterruptible power supplies (UPSs), power distribution units (PDUs) and rack access devices. Examples of control operations performed by these control devices include performing a self test operation on a UPS, turning a PDU outlet on or off and locking or unlocking a rack access device.

As referred to herein, a "constrained computing device" generally refers to a low-cost computing device built to perform a well-defined set of functions focused on monitoring and controlling managed devices. Unlike large scale computing devices, constrained computing devices typically have limited storage and limited computing power. Storage generally includes RAM, Flash memory and a magnetic hard drive. In general, mechanisms for collecting, monitoring and controlling managed devices involve significant interrupt mode and kernel mode processing unlike monitoring applications on general purpose PC devices. Applications on general purpose PC devices typically do the bulk of data collection and processing in processes in user mode, where full operating system functionality is available. In particular examples, the constrained computing device may include applications for alarming and data communication through communication conduits using standards such as USB, HTTP, FTP, SMTP, SMS, and SNMP. In some embodiments described further below, the constrained computing device or the managed devices communicate with sensors or sensor pods that include cameras and a variety of other environmental sensors.

Examples of the processes and apparatus described herein are not limited in application to the details of construction and the arrangement of components set forth in the following description or illustrated in the accompanying drawings. The processes and apparatus are capable of implementation in other examples and of being practiced or of being carried out in various ways. Examples of specific implementations are provided herein for illustrative purposes only and are not intended to be limiting. In particular, acts, components, elements and features discussed in connection with any one or more examples or embodiments are not intended to be excluded from a similar role in any other examples or embodiments.

Also, the phraseology and terminology used herein is for the purpose of description and should not be regarded as limiting. Any references to examples, embodiments, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Multi-Purpose Journal System

Aspects and embodiments disclosed herein manage control operations of one or more managed devices using a memory based data and control journal implemented by a journaling component resident within a constrained computing device. One example of a constrained computing device is described further below with reference to FIG. 1. However, examples of constrained computing devices are not limited to the particular configuration illustrated in FIG. 1. Various examples utilize a variety of hardware components, software components and combinations of hardware and software components configured to perform the processes and functions described herein. For instance, one example of a constrained computing system is implemented using a relatively low-cost Linux-based computing device.

In other embodiments, the journaling component implements the journal without using a file system or high-level operating system functionality. According to these embodiments, the journal is structured to include a plurality of variable definitions, one or more variable update definitions, a table of variable records, a plurality of variable updates, and a plurality of context records. Each variable definition defines a data structure for storing instances of the variable defined by the variable definition. Likewise, each variable update definition defines a data structure for storing instances of the variable update defined by the variable update definition.

Each stored instance of a variable is referred to herein as a "variable record," and each stored instanced of a variable update is referred to herein as a "variable update record" or simply as "update records." Particular examples of these data structures are described further below.

In other embodiments, the journal is implemented by a kernel mode data journaling component or a device driver. Kernel mode components and applications generally execute with supervisor privilege within the kernel of the operating system. Device drivers generally include a specialized piece of code, either integrated with or loaded by the operating system kernel, that runs with kernel privilege and that provides a service or access to a hardware device. In one exemplary embodiment, the journaling component provides interfaces for interrupt, kernel, and user mode updates and access to the journal, including transactional updates (with rollback) from interrupt, kernel, and user mode.

In another embodiment, the constrained computing device provides access to stable snapshots of the state of the journal as of a given time without copying data within the journal. In yet another embodiment, the constrained computing device provides support for step-by-step traversal of the update sequence of the journal, allowing even slow applications to avoid missing short-term data events. Each step in the traversal provides a stable view of the whole journal at a point in time in the history of the journal that corresponds to the time of the last update. Another embodiment includes support for efficiently reclaiming space from the journal after accessing applications move past older updates. Some embodiments also provide mechanisms for defining named variable records of various data types, as well as supporting metadata for these variable records.

In one exemplary embodiment, a constrained computing device monitors a space and equipment disposed within the space. This equipment may include computer equipment or managed devices. In this embodiment, the constrained computing device communicates data associated with the space and the equipment to a remote system. For example, the constrained computing device may gather environmental data, such as temperature, air flow, humidity, leak detection, power quality, and motion detection, store the gathered data in a journal and transmit the gathered data to a remote computer system.

In this embodiment, the constrained computing device also issues control instructions to the managed devices that it monitors. For instance, the constrained computing device may receive control instructions from a user or a remote system, store the control instructions in the journal and transmit the instructions to the managed device targeted for the control instructions. Upon receipt of the control instructions, the managed device performs the control operation requested therein.

FIG. 1 depicts an exemplary constrained computing device 102. The constrained computing device 102 includes a processor 104, peripheral interfaces 106, network interfaces 116, memory 118 and a bus 124. The memory 118 includes a journal 122, various other data 114, and programs and software instructions 116. The journal 122 includes a table of variable definitions 108, a set of variable update records 110 and a set of context records 112. The processor 104 performs a series of instructions that result in manipulated data. By executing the instructions, the processor 104 performs logic functions, data gathering and communications functions. The processor 104 may be a commercially available processor such as an Intel Pentium, Motorola PowerPC, SGI MIPS, Sun UltraSPARC, or Hewlett-Packard PA-RISC processor, but may be any type of processor, multi-processor, microprocessor, controller or microcontroller as many other processors and controllers are available. The processor 104 is connected to other system elements, including memory 118, by the bus 124.

The peripheral interfaces 106 exchange (i.e. send or receive) data with devices that communicate using serial or parallel peripheral communications standards such as RS-232, USB and SCSI. The peripheral interfaces 106 may interact with sensors, such as analog or digital sensors, sensor pods, UPSs, PDUs, display monitors, rack access devices, door contact sensors, printers, or any other device that communicates via peripheral communications standards. For example, the peripheral interfaces 106 may gather temperature, humidity, airflow, video, audio, dry-contact, and other data from specific sensors or may transmit control commands to a UPS or PDU. The network interfaces 116 may provide communications connectivity to other computing devices. For example, via the network interfaces 116, the constrained computing device 102 may communicate data with wired and wireless networks, such as public or private networks, LANs, WANs, extranets and intranets, ethernet, telephony, Bluetooth, 802.11, 802.16 and other networks.

The memory 118 generally takes the form of random access memory (RAM) and flash memory. However, permanent, non-volatile (non-transitory) data storage, such as a magnetic hard drive, may be provided. The memory 118 includes tables and record sets 108, 110, and 112, which form the base data structures for the journal 122. The table of variable definitions 108 contains records describing data objects within the journal. In a particular implementation, these records are arranged in a hash table, such as a table hashed using the name of each variable, to allow fast lookup. For faster access, the records describing each variable may be fixed in memory, allowing a pointer or some other index to be used as a handle for accessing a variable.

The global set of variable update records 110, also referred to as a global journal, includes an ordered journal of updates, providing a history of the value updates of sensor values, configuration data and control data. Each update record is also a member of a variable-specific update set, allowing the value history for a given variable to be easily accessed. In one particular embodiment, the global set or global journal 110 is implemented as a next update pointer in each update record.

The set of context records 112 describes views into the journal for each of the applications accessing the journal. Each context record may include a pointer into the global update journal and a corresponding update timestamp. The pointer indicates where in the history of the data model the context is referring. Context records may also include support for filtering the view of the data, for example, by restricting the view to selected variables that are of interest.

Memory 118 may also include other data 114 such as threshold data, application data, video data, audio data, alert and alarm contact data, and other data objects associated with performing monitoring and control functionality. Memory 118 may also include computer-implemented programs 116 configured to direct processor 104 to provide functionality, such as, for example, data monitoring, alert and alarm functionality, data transfer, and network communications. For example, the programs 116 may include the data journaling component described above. The programs 116 may also include a data monitoring application with data objects useful in comparing data to threshold values and useful in determining alarm conditions. The programs and instructions 116 may further include applications configured to contact, notify or alert other systems and personnel when alarm conditions occur. The programs and instructions 116 may also include interface applications configured to provide one or more interfaces to external entities, such as a user or external system. The interface applications may implement one or more interfaces through which the interface applications receive requests to alter the operational state of a managed device. In response to receiving such a request, the interface applications may validate the request, store the request in the journal and issue the request to the managed device. Upon receipt of the issued request, the managed device may implement the requested operational state change. The programs and instructions 116 may further include applications, such as web servers and email applications, for transferring or communicating information and data. For example, the programs and instructions 116 may be configured to direct the processor 104 to communicate via the peripheral interfaces 106 or the network interfaces 116 using communications standards such as serial or parallel protocols, USB, FTP, SNMP, SMTP, HTTP, and SMS.

In some embodiments, the programs and other components disclosed herein may read parameters that affect the functions performed by the programs and components. These parameters may be physically stored in any form of suitable memory including volatile memory (such as RAM) or nonvolatile memory (such as a magnetic hard drive). The parameters may be logically stored in a propriety data structure or in a commonly shared data structure (such as an application registry that is defined by an operating system). Some embodiments provide for both system and user interfaces that allow external entities to modify the parameters and thereby configure the behavior of the components.

Each variable record in the journal defines a uniquely named entity, typically using a textual name, with a specific data type. In a particular embodiment, each sensor in the system has an associated variable record for which the current value is the sensor reading. In another embodiment, each device control provided by a managed device has an associated variable record for which the current value represents the operational state of the control. The operational state of a device control can be programmatically altered by changing the current value of its representative variable record. Other data, such as configuration, error conditions, status, and security settings can be stored as variable records within the journal. Table 1 depicts an exemplary variable definition for variables used in some embodiments. The variable definition of Table 1 may be used to create sensor variable records and device control variable records within the journal.

TABLE 1

| Datatype | Name | Description |
| --- | --- | --- |
| ulong | Magic_Number | indicates type of structure, and to verify pointers |
| char | *ID_string | unique ID of variable |
| class_ptr | Class | pointer to "class" of variable - use for categorization |
| enum varitype | Type | Enumeration describing which data type is used by the variable |
| ulong | Creation_timestamp | used to resolve between different copies of a variable that might exist due to the variable being destroyed and recreated |
| priv | Privilege | access privileges |
| varupdate | Oldest_Update | update record containing the oldest available value of the variable |
| varupdate | *Latest_Update | pointer to most recent value update of the variable |
| varmeta | *Metadata_List | pointer to list of metadata records, providing extra variable data |
| enum varflags | Type_Flags | used for basic attributes (read-only, persistence) |

TABLE 1-continued

| Datatype | Name | Description |
| --- | --- | --- |
| variable | *Next_Variable | used for linking the record into lists within the hash table |
| ulong | History_Time | setting for controlling how much value history to preserve, independent of journal length |
| varhist | *History_List | list of history records for holding values that have been removed from the journal but are still needed to support the History Time |

Figure 2:
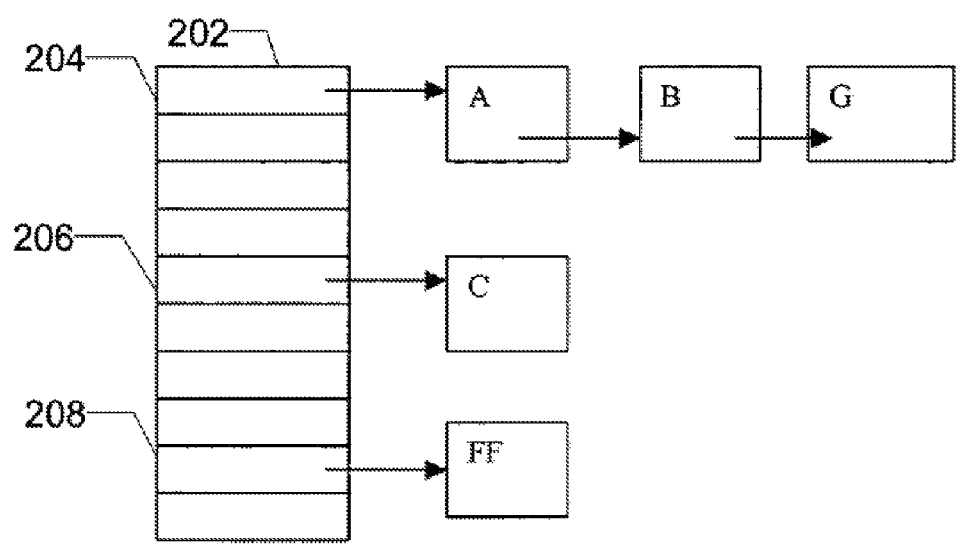
FIG. 2 is a block diagram depicting a table of variable records.

The variable records may be stored in or accessed via an open hash table, with the records hashed by the ID_string or a concatenation of Device_ID and Control_ID. As shown in FIG. 2, a hash table 202 may include records hashed by ID_string or the concatenation of Device_ID and Control_ID, such as records 204, 206, and 208. These records may point to update records with timestamps as indicated by records A, B, C, G, and FF.

Variable records referenced in the hash table may be uniquely identified by ID_string in combination with creation time. Creation time is useful in handling the situation in which a variable record is deleted and recreated during the lifetime of the journal. When the hash table is searched for a variable, the lookup is relative to a desired time reference, for example, either the present time or the context used to view the data. The combination of the creation time and the time of the last update of a given variable record is used to select from among the records that may exist for a given variable record ID_string. If the variable is deleted, the time of the last update is the time of the deletion. Likewise, if no variable record existed at the desired time reference, which may be before or after the variable was created or destroyed, the lookup can recognize the absence of the variable record and act accordingly.

Each variable record may also include descriptive data, such as the data type, attribute flags, and class of the variable. In a particular embodiment, a significant variety of data types are supported, including signed and unsigned integers (32-bit and 64-bit), single and double precision floating point numbers, Booleans, strings, string lists, timestamps, byte arrays and structured data values, such as lists of other data value primitives.

One embodiment also supports a variety of attribute flags including basic access control, such as a read-only flag, a lock flag, a constant flag, and an undeletable flag; name scope control, such as a flag indicating that the variable ID is globally unique across multiple systems or locally unique; and persistence control, such as a flag for indicating that the variable should be saved to permanent storage and restored when the system is restarted.

In another embodiment, each variable record also includes a variable update record. Variable values may be stored in variable update records. The variable update record embedded within the variable record stores the oldest value of the variable, which provides the base-line version of the variable. The updates contained in the journal are, generally, assumed to be relative to the base-line values stored in the variable records. For example, if no update is in the journal, or if the update is after the time in question, the oldest value embedded in the variable record will be used to describe the value of the variable. In one particular embodiment, each variable update record consists of the fields depicted in Table 2.

TABLE 2

| Datatype | Name | Description |
| --- | --- | --- |
| variable | *var | the variable that the updated value refers to |
| ulong | update_time | the timestamp that the value update occurred |
| varvalue | value | the updated value |
| varupdate | *next_var_update | pointer to the next newer update for the same variable |
| varupdate | *prev_var_update | pointer to the next older update for the same variable |
| varupdate | *next_global_update | pointer to the next newer update in the global journal |

Variable update records may be linked into at least two different ordered sets. One set represents the value history of a specific variable, such as through using the next_var_update and prev_var_update pointers, and another set represents the global value history or global journal for the variables in the system. In both cases, the order of the records may be sorted by update timestamp with records "before" a given record having a timestamp equal to or lower than that of a given record, and records "after" a given record having a timestamp equal to or higher than that of the given record. This ordering is naturally produced due to the insertion process, since newer updates will have higher timestamps than older ones.

As used herein, the term "timestamp" refers to numeric values representing an ordered sequence of time in history. Depending upon the implementation, timestamps may be literal timestamps with sufficient resolution so that matching values can be considered by the system to be nearly simultaneous or an incrementing version stamp where each atomic update or set of updates receives a new value which is higher than all previous values, such as by using an incrementing counter. In general, the mechanism used for producing timestamps should satisfy the following exemplary rules: A single variable cannot have more than one update with a given timestamp value (i.e. any two updates for a given variable must have different timestamps). Any two updates to two different variables that are not considered to have occurred simultaneously must have different timestamps, with the older of the two updates having a timestamp lower than the newer one. Any two updates to two different variables that are considered to have occurred simultaneously must have the same timestamps.

Figure 3:
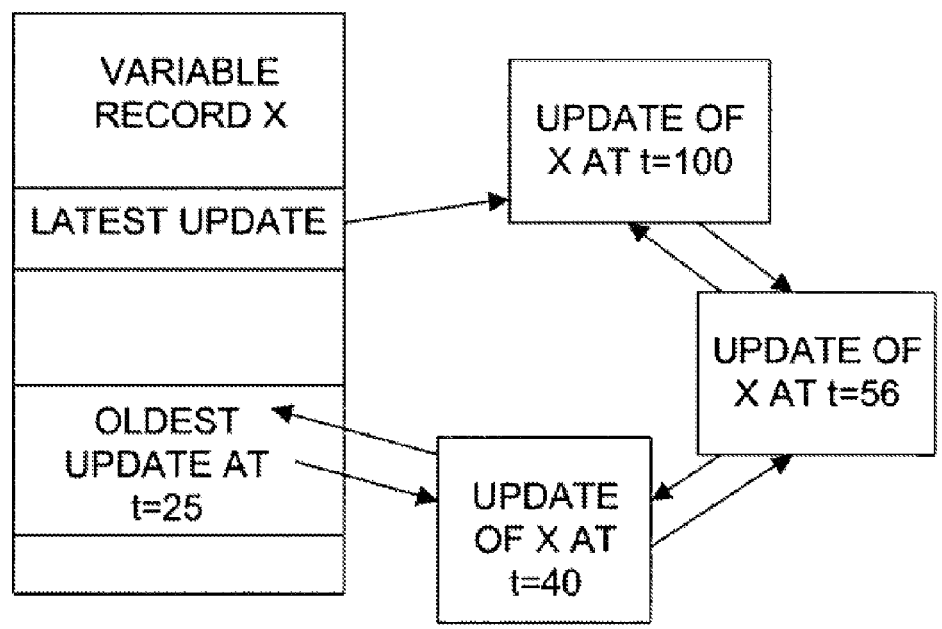
FIG. 3 is a block diagram depicting links between a variable record and update records.

For a given variable, the combination of the variable record and its update records form a doubly-linked circular list. For example, as shown in FIG. 3, a record for Variable X includes a Latest Update field that points to an Update Record at the most recent time, in this case t=100. The Update Record at t=100 points to the previous Update Record at t=56. The Update Record at t=56 points to the Update Record at t=100 and the Update Record at t=40. The Update Record at t=40 includes pointers directed at the Update Record at t=56 and the Oldest Update Record at t=25. The Oldest Update Record may be incorporated into the Variable Record X.

Figure 4:
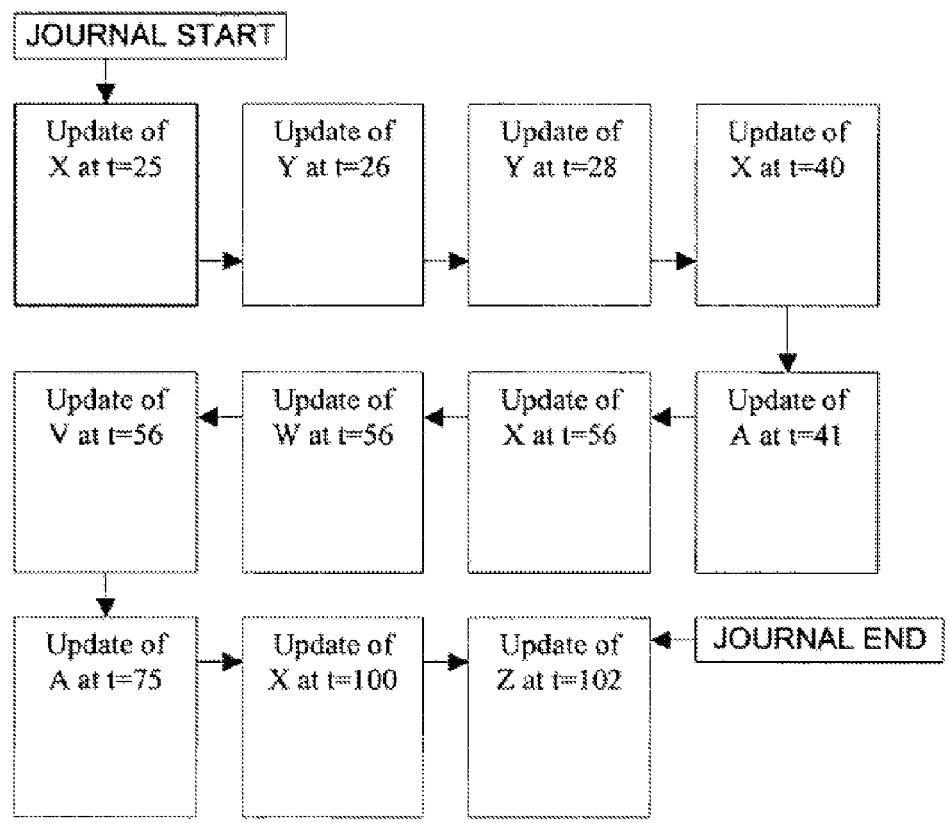
FIG. 4 is a block diagram illustrating a global update record set.

Similarly, the update records, including those embedded in the variable record, are linked and ordered into a single list, representing the global value journal for the whole data system. As shown in FIG. 4, the global journal start pointer indicates an update record with the oldest timestamp, in this case, the lowest time t=25. Each update record points to the next chronological update record. For example, an update record for a variable (X) at t=25 may point to an update record for a different variable (Y) at t=26. Similarly, an update record for a variable (Y) at t=26 may point to an update record for the same variable (Y) at t=28. Update records for different variables may have the same timestamp. The most recent update record is the journal end pointer, in this example, an update of variable Z at t=102.

In general, when the value of a variable record is updated, a new update record is created and initialized with a new value, an appropriate timestamp, and pointer to the variable record. The new update is added to both the end of the global journal (using the journal end pointer) and the newest end of the variables local set of values (using the latest update pointer in the variable record). The simple structure of the journal allows this operation to be quickly accomplished, even in interrupt mode with, for example, protection provided by interrupt disables, spin locks, or other system appropriate mechanisms. If interrupt mode update and/or access is not used, semaphores can also be used for providing concurrency protection.

Since the value history of a variable record is likely to be of interest, deletion of a variable record is treated as a special case of a value update. A special reserved value is stored in the value field of the update record, indicating that the current value is now "deleted". When the variable is being accessed for its value at a given point in time, the search of the hash table can quickly determine that a given variable record did not exist at a given point in time by comparing the desired timestamp to the creation time and to the value and timestamp of the latest update. If the creation time is newer than the timestamp, the variable did not exist yet. If the value is "deleted" and the timestamp is before the desired time, the variable no longer existed at that time.

According to at least one embodiment, stable reader access to the journal is accomplished using variable records referred as "access contexts." Table 3 shows one example of an access context variable definition.

TABLE 3

| Datatype | Name | Description |
| --- | --- | --- |
| ulong | current_ts | current timestamp of data being accessed through this context |
| enum varflags | Type_Flags_Mask | bit-mask for selecting which "Type_Flags" bits are required to match |
| enum varflags | Type_Flags_Value | bit-mask for providing the values of the bits of "Type_Flags" which were selected by "Type_Flags_Mask" (i.e. Type_Flags AND Type_Flags_Mask == Type_Flags_Value for matching variables) |
| varclass | *class | class of variables which will match (null if any variable class is OK) |
| varcontextmetafiler | *meta_flt | list of metadata slot Ids and values which a variable must match to be selected (null if no metadata slot restrictions) |
| varupdate | *next_update | pointer into journal to next update to be read/processed when reading updates sequentially: null if all updates have been read |
| varaccesscontext | *next, *prev | pointers for listing all access contexts |

According to this example, the current_ts field is used to provide a target time when the value of a variable is requested and to prevent pruning of updates. The minimum value of the current_ts field for active access contexts can be found, maintained, and used for setting the limit on what portion of the journal is pruned.

In one embodiment, the next_update pointer points directly into the journal, allowing update records to be read, one by one, from the journal. When combined with the current_ts timestamp, the constrained computing device can quickly determine when more than one update record was generated simultaneously near the time specified by the current_ts timestamp by reading update records sequentially and recording those update records having the same timestamp. In another embodiment, the other fields (Type_Flags_Mask, Type_Flags_Value, cls, meta_flt) are used to filter the variable records shown through the access context to only those of interest. Each of these fields, when defined, provides matching requirements for different fields in the variable record to be matched in order for a variable to be of interest to, and accessible via, to the access context. The other fields may be used to allow quick traversal of the journal. Update records associated with variable records not matching the filters are skipped without being reported to the reader of the access context.

Enumeration of the variable population and associated values at the given time represented by the access context may be accomplished by traversing the hash table of the variable records, skipping variable records representing variables that do not exist at the target time and variable records that do not match the access context's filters, and reading the values using the current timestamp as the target time. For large variable populations with frequent filtering, additional hashing or sorting of variable records with common filtered attributes may be performed to increase search efficiency.

Variable records also provide a structure for storing additional supporting data ("metadata") for the variable records. Such metadata may be used to specify additional information such as units, value ranges, labels, access control, and other application-specific data that is linked to the variables. Table 4 illustrates an exemplary data structure for metadata records.

TABLE 4

| Datatype | Name | Description |
| --- | --- | --- |
| metadata_def | *type | pointer to metadata type definition |
| varmdupdate | *latest | pointer to the latest update for the same variable |
| Varmdupdate | Oldest | the oldest/initial update for the same variable |
| varmdupdate | *next | pointer to the next metadata record |

In a particular embodiment, each metadata slot is defined by a metadata update record as shown in Table 5.

TABLE 5

| Datatype | Name | Description |
| --- | --- | --- |
| variable | *var | the variable that the updated value refers to |
| ulong | update_time | the timestamp that the value update occurred |
| varvalue | value | the variable's value at update_time |
| varupdate | *next_var_update | pointer to the next newer update for the same variable |
| varupdate | *prev_var_update | pointer to the next older update for the same variable |
| varupdate | *next_global_update | pointer to the next newer update in the global journal |
| metadata | *md | the metadata definition |
| varvalue | slot_value | the updated value |

Each metadata slot value contains a pointer to the metadata record associated with the slot value, the value of the slot, and pointers for chaining with the other metadata slot values for a given variable record.

In one embodiment, metadata is used to initiate control operations via a device control within a managed device. According to this embodiment, a metadata slot is created on a variable record that represents a device control targeted for a control operation. This metadata slot is assigned a control value to which the device control is changed to execute the control operation. In a particular embodiment, this control value is represented as an unsigned integer. An associated array of descriptive labels is also provided to make the value selection more meaningful within a user interface presented by the constrained computing device. Additional exemplary processes executed by this embodiment of the constrained computing device are described further below with reference to FIGS. 7-9.

Multi-update transactions may be implemented by accumulating a desired set of update records without adding them to the journal or the update record sets of the variable records until the transaction is committed. When the transaction is committed, update records in the transaction are given the same update timestamp, added to the global journal, and linked into each of the update record sets of the variable records as if the update records were created individually. Only the commit processing is performed within the mutual exclusion (interrupt disable or semaphore, as indicated earlier) section of the code. The transaction can be accumulated step-by-step without entering the critical section. Likewise, the transactions can be rolled-back by simply deleting the update records within the transaction before the transaction is committed. Similarly, creation of new variable records within a transaction is accomplished by accumulating the new variable records, and adding them (and setting the creation timestamp) when the commit is complete.

One exemplary embodiment is based around a journaling component implemented as a kernel mode device driver and provides a set of C-callable function calls providing the full set of journal capabilities. A kernel mode implementation generally means running with supervisor privilege within the kernel of the operating system. A device driver generally means a specialized piece of code, either integrated with or loaded by the operating system kernel, that run with kernel privilege and provides a service or access to a hardware device. These interfaces are designed to be called either from interrupt-context or task-mode, allowing their use from other kernel mode device drivers and subsystems. A particular exemplary embodiment provides a character device driver interface, including a full set of ioctl( )-based functions, for implementing the full set of journal capabilities. In addition, the character driver includes support for asynchronous (non-blocking) I/O, allowing select( ) to be used for timed waiting for updates from an access context.

In addition, a C-style interface may be provided through a shared library (which may be implemented using the character driver interfaces). The C-style interface enables applications executing in user mode to utilize the kernel mode journal via library calls and data structures. Table 6 illustrates an exemplary data structure that user mode applications can manipulate to exchange data with the kernel mode journal.

TABLE 6

| Datatype | Name | Description |
| --- | --- | --- |
| u32 | Current_Value | value of control as an unsigned 32 bit data type |
| bool | Lock | locked, true if control is to be made unavailable |
| char* | Verify_Indicator | string indicating which verification strategy to use |
| list | States_List | List of possible states the control can be set to |
| bool | Scan_Flag | perform a scan of the control immediately |
| u32 | Next_Value | value to set the control to |
| u32 | Current_Status | current status of the control |
| list | Values_List | List of possible status values |
| octet | Schedule | control schedule representation |
| list | Results_List | List of possible result states for the control |
| string | Device_ID | ID of device which contains the control |
| string | Control_ID | descriptive label of the control |

As shown in Table 6, the user mode device control variable definition defines a data structure that includes storage for a variety of information pertinent to processing control instructions. This information includes for the current value or state of the control, a list of possible states or values that the control can be set to, the current status of the control (whether it is in an operational state or not), as well as the particular value that represents the operational state that the device control will adopt when a device control operation is initiated. The value representative of the operational state of the device control of the managed device is typically received from a user, via a user interface, but may also be received, via a system interface, from some automation programmed to react to other system updates. An object-based C++ style interface may be used for implementation, as well.

To allow easy use from scripting environments, several command-line interface tools may be implemented using the C-style library, providing access and modification mechanisms. The exemplary implementation may also include a set of CGI (Common Gateway Interface) modules implementing both query and update XML grammars for the journal. One example of such an XML Grammar is provided within the Appendix of U.S. Pat. No. 7,542,963, which is hereby incorporated by reference. These grammars may allow a full set of methods for querying the journal and returning subsets of the journal, as well as creating, modifying, and deleting data within the journal. These XML-based web interfaces may provide a programmatically friendly way for a Java-based application provided as a GUI implementation, a centralized mass administration tool, and other third party applications to interact with the device implementing the journal. A query CGI may include support for both inputting an XML-based query (as form-data input of a POST) and returning the data in the response, or running pre-canned queries stored on the device and tied to defined URLs. An exemplary embodiment may also include support for substitution of values derived from the journal into standard HTML documents using an XML-based macro grammar.

An exemplary embodiment includes a custom SNMP sub-agent, which provides a process for providing tables to the SNMP agent representing the values and metadata slots of variables of a given class. These mappings provide an interface through which variable records in the journal, such as sensors variable records, device control variable records and configuration data records, are published for access through standard SNMP access processes. Another exemplary embodiment includes mechanisms for generating XML-based reports (using the same grammars as used for the Web Access), and delivering these reports using FTP to an FTP server, HTTP POST-ing (form data delivery) to a remote web server, or SMTP-based e-mail delivery.

The interfaces disclosed herein, which include both system interfaces and user interfaces, exchange information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the energy management system or unauthorized access to the energy management system.

Multi-Purpose Journaling Processes

Figure 5:
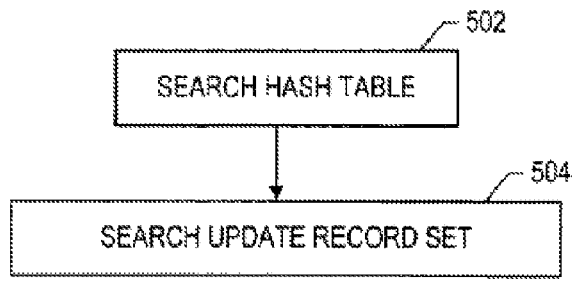
FIG. 5 is a flow diagram depicting a process of finding a current value of a variable record.

Some embodiments perform processes for managing device controls using a memory data journal. More particularly, in at least one embodiment, processes disclosed in conjunction with FIGS. 2-9 are performed using a journal that includes a journaling component and data structures such as those as described above. As one example, FIG. 5 illustrates a process of accessing a value of a variable record at a target time. As shown in act 502, the hash table is searched for one or more variable records matching the following criteria: the ID of the variable record matches the ID of the target variable record, the creation time of the variable record is less-than-or-equal-to the target time and either the latest update value is not "deleted" or the latest update time is greater-than-or-equal-to the target time. If no variable record is found that meets these criteria, the variable record does not exist at the target time. If a variable record is found that meets these criteria, the update record list associated with the variable record is searched, starting at the update record pointed to by the latest update pointer, until an update record with a timestamp less-than-or-equal-to the target time is found or the list of update records is completely searched, as shown in act 504. If such an update record is found, its value is the value of the variable at the target time. If the timestamp of the oldest update record, for example, in the variable record itself, is greater-than the target time, the value at the target time is no longer in the journal.

In a particular embodiment, the update record list for a given variable record is a simple, double-linked list, which may be traversed linearly to find a value. Linear traversal is generally desirable where the length of the update record history for a given variable is small, timestamp comparisons are very fast, and most value queries are for either the current value (the first in the list) or one of the most recent values (those closest to the start of the search). In implementations where these assumptions may be inappropriate, use of a heap, binary tree, or other data structure providing a faster-than-linear lookup may be used.

Since the access contexts consist of a very small set of data, access contexts can be easily created or copied. One common use of access contexts is for threshold processing. Threshold processing code may operate either by reading updates, one by one, and checking for threshold violations on those variable records of interest that are changing values or by skipping forward by prescribed periods of time, and traversing all desired data. Checking one by one prevents the need to poll all variables frequently since the threshold code can assume that a variable record representing a sensor still has the same value as the last time it was read unless a new value update record is reported. If a problem is found (such as transgression of a threshold), another program, such as a notification process for sending e-mail or generating reports, may be invoked by the constrained computing device. By copying the access context and passing the copy to the notification program, the constrained computing device enables the notification process to report on the same system state, including the same sensor values, device control values and other configuration data, as present at the time that the problem was reported. Meanwhile, the threshold processing code can continue to process newer data update records, without waiting to preserve the data state for the notification code, and without causing the notification code to potentially report from a state different than the state in which the problem was detected. When the notification process is completed, it can close or release the access context, allowing the system to prune the journal of the older updates that are no longer of interest.

Figure 6:
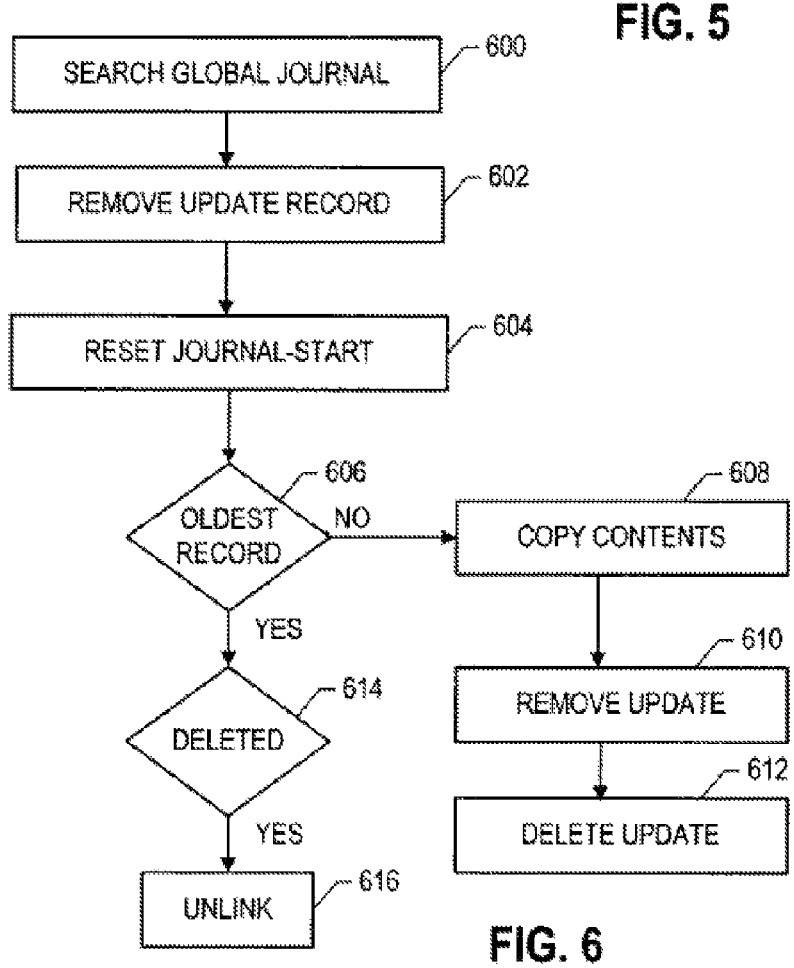
FIG. 6 is a flow diagram illustrating a process of pruning a data journal.

The journal supports being pruned based on retiring records in the journal older than the oldest timestamp of interest, as shown in FIG. 6. Starting at the journal start, each update record is checked until one is found that is newer than the oldest timestamp value still of interest, as shown at act 600. In one exemplary embodiment, this oldest timestamp would be indicated by the context record with the oldest current_ts field. As shown in act 602, the update records prior to the update record found in the act 600 is removed from the journal. The journal start is reset to the update record found in the act 600, as shown in act 604. The age of the record is determined, as shown in act 606. If the update record is not the oldest record for the given variable record (based on comparing its pointer to the address of the oldest update record within the variable record owning the update record), the contents of the update record are copied into the oldest record, as shown in act 608, the update record is removed from the update record set of the variable record, as shown in act 610, and the update record is deleted, as shown in act 612. If the record was the latest for the variable record, the latest pointer is directed to the oldest record within the variable record. If the update record is the latest for the given variable record, and the value is "deleted," as shown in act 614, the variable record is unlinked from the variable hash table, as shown in act 616, and the variable record is deleted. Pruning of the journal can be initiated for a variety of reasons, including closing of data model readers, resulting in changes in the oldest timestamp of interest; readers moving forward through the journal also causing such changes; or resource constraints, such as the population of update records exceeding a system prescribed limit or age limit.

Another use of the data stabilization provided by access contexts is for potentially long-running data processing, such as saving the variable data to disk or accessing the variable data across a network. The time-consistency gained by the access context allows the relative slowness of these processes to not cause problems with their successful execution either by forcing the sensors, managed devices or other data updaters to block or stop updating temporarily, or by requiring the production of a memory expensive copy of the data into fast storage, such as RAM, so that the slow processing can have a stable data image on which to operate. The option for such processes to listen for just the values that have been updated, by, for example, traversing the update journal, also allows for efficient incremental data communication such as only sending the data updates across a network, instead of a full copy of mostly-unchanged data.

In a particular embodiment, each variable record can optionally be assigned to be of a certain class. Variable classes are defined by data structures that include a unique ID string, a pointer to a parent class (if any), access privileges, and a list of class-specific metadata values. Exemplary Classes are used in the following ways: 1. Variable classes can provide metadata slot values, which can be treated as the default value for any slots not specifically defined by a given variable record. This allows significant memory savings when metadata is frequently used, and often common for different variable records of the same class. Since classes support having parent classes, this inheritance of slot values can be easily extended: new subclasses can provide overriding slot defaults while simply inheriting other defaults. 2. Classes and superclasses can be efficiently used for filtering among different variable records when enumerating or when scanning update records using an access context, since the instance-of operation can be implanted by a simple pointer compare combined with a tree walk from the variables class, to its parent, etc. 3. Defining access control. 4. Providing for registering listener functions, such as constructors, destructors, update verifiers, and update notifiers.

The exemplary implementation includes multiple access methods for the journal. Exemplary methods of access include implementation of these functions: 1. Creating, updating, and deleting variable records and their metadata. 2. Defining data classes and metadata slots. 3. Creating, copying, and deleting access contexts, and setting filters on those access contexts. 4. Enumerating and querying variable records using an access context (or accessing the "current values" without one). 5. Watching and processing updates, step-by-step.

A further exemplary embodiment may include an application for utilizing the C-style library interface for monitoring and controlling data updates, and storing copies of variable records marked as persistent (as indicated by the type flags) to an XML-based file encoding. At system restart, this file may be used to initialize the journal and restore those variable records, update records, access contexts, metadata and other supporting data to the state corresponding to a previously stored state. This same process can be used for saving and restoring configuration data externally from the device.

Figure 7:
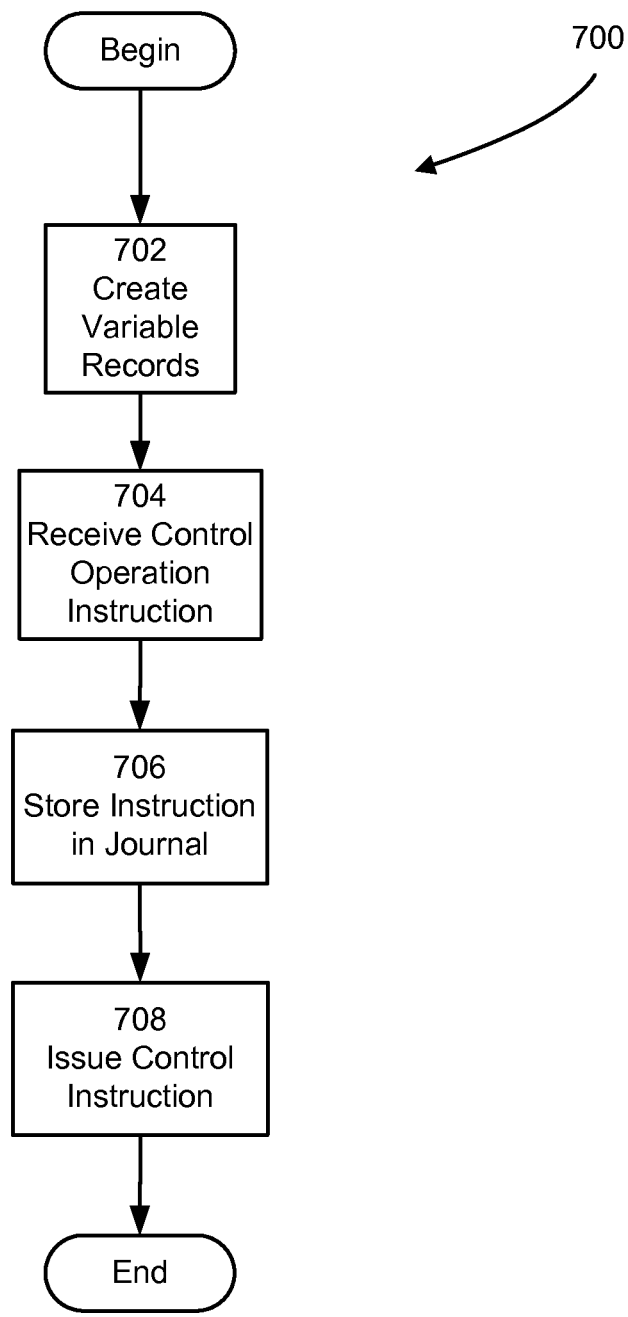
FIG. 7 is a flow diagram illustrating a process of managing device control operation using a journal.

FIG. 7 illustrates another exemplary process 700 of managing the operational state of device controls using a data journal. As shown in FIG. 7, the process 700 begins in act 702 where a constrained computing device creates one or more device control variable records for each managed device monitored and controlled by the constrained computing device. In one embodiment, each device control variable record represents a single device control included with a managed device. Upon creation, these variable records are made available to the rest of the components of the constrained computing device. The act 702 may be executed by the constrained computing device at various predetermined times or in response to various events. For example, the constrained computing device may execute the act 702 when a managed device is first discovered by the constrained computing device or when a managed device is added to the list of managed devices monitored and controlled by the constrained computing device.

In act 704, the constrained computing device receives an instruction to alter the operational state of a device control. In some embodiments, the constrained computing device implements an interface that executes in user mode and through which the constrained computing device receives control instructions to perform a control operation. In one embodiment, the interface is a user interface. In another embodiment, the interface is a system interface that allows other processing components to submit control instructions.

Figure 8:
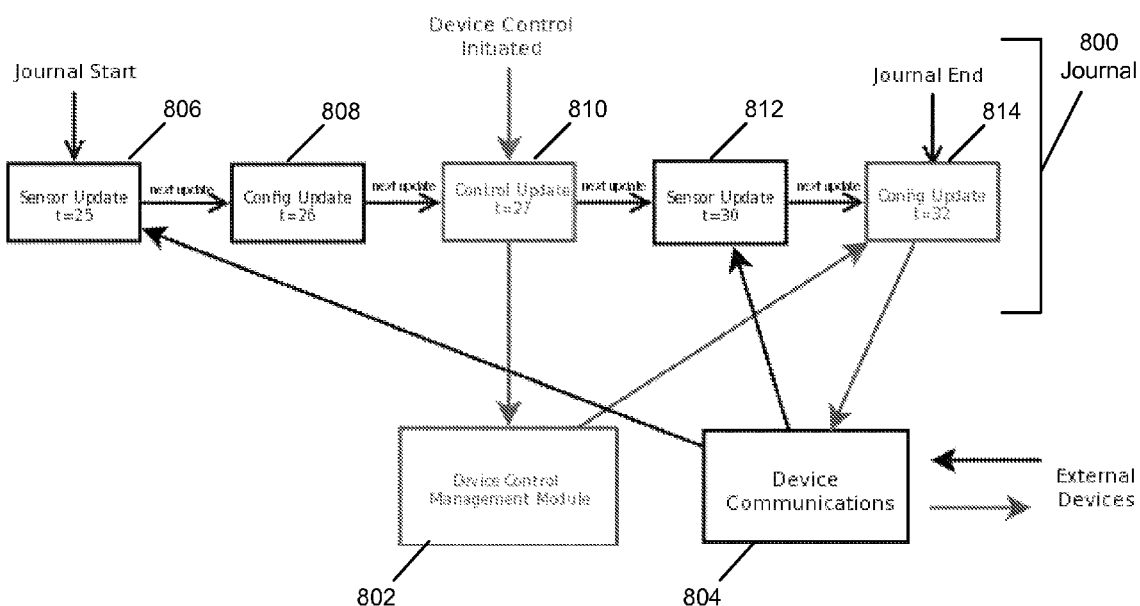
FIG. 8 is a block diagram illustrating another global update record set.

In act 706, the constrained computing device stores information representative of the control instruction in the journal. In some embodiments, this information is stored within an update record for a device control variable record that represents the device control targeted by the control instruction. In at least one embodiment, the update record used to store the control instruction is a metadata update record. FIG. 8 illustrates several components of a constrained computing device including a journal 800 that stores metadata update records. More particularly, as shown in FIG. 8, the journal 800 includes sensor update records 806 and 812, configuration update records 808 and 814 and a device control update record 810. FIG. 8 also illustrates a device control management module 802 and a device communications interface 804, both of which are described further below.

Figure 9:
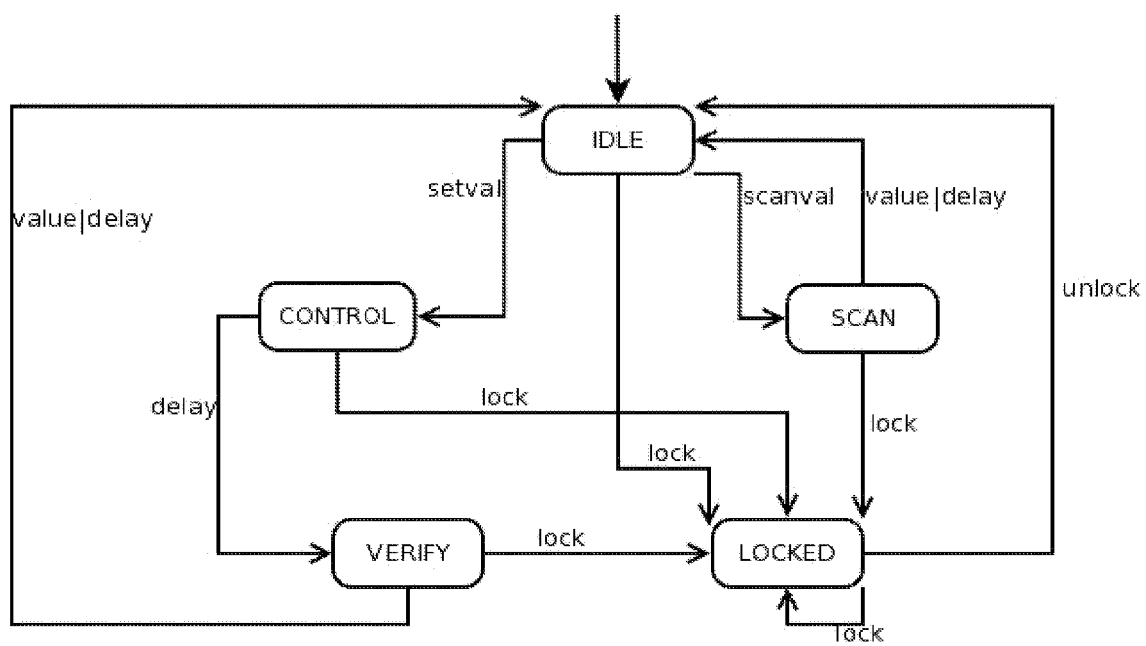
FIG. 9 is a flow diagram illustrating a device control operation life cycle process.

Returning to FIG. 7, in act 708, the constrained computing device issues a control instruction to a device control. In some embodiments, metadata is used to initiate control instruction. In at least one embodiment, this act is performed by the device control management module 802, which contains all the logic necessary to coordinate device control operations throughout the device control operation life cycle. The device control life cycle is a series of state transitions that a device control moves through when implementing a control operation. FIG. 9 depicts the life cycle. As shown in FIG. 9, the life cycle starts at an IDLE or available for control state and typically proceeds through the states CONTROL and VERIFY and finally back to the IDLE state. Optional states could exist for updating the current value (SCAN) or making the control variable unavailable for control operations (LOCKED).

According to the embodiment illustrated in FIG. 8, when performing the act 708, the device control management module 802 analyzes update records that store control instructions and generates operational parameters and other configuration information that is provided to the device control. The configuration information, when applied by the managed device to the device control, alters the operational state of the device control according to the control instructions. As describe below, in some embodiments, the configuration information is simply a value assigned to an operating parameter of the managed device.

In one embodiment, to initiate a device control operation, the constrained computing device updates the value of the device control variable record that represents the device control to a target value that represents the target device control operation or state. When a journaling component receives the updated value, the journaling component creates a metadata update record, such as the metadata update record 810, and stores the target value as a metadata slot value within the metadata update record. Next, the journaling component appends the metadata update record to the journal 800. As illustrated in FIG. 8, this metadata update record is ordered with all other updates in the journal 800 and is processed in order of its arrival in the journal 800. The device control management module 802 receives update records for device control variable records from the journal 800 and therefore will process the metadata slot value contained in the metadata update record. Next, the device control management module 802 checks the current state of the device control targeted for the device control operation. If the current state of the targeted device control is IDLE, the device control management module 802 appends a configuration update record to the journal 800. The device communications module 804 then processes this configuration update record and issues a device control operation instruction to the target device control. The process 700 ends after completion of the act 708.

The processes disclosed herein each include one particular sequence of acts in a particular example. The acts included in processes may be performed by, or using, one or more constrained computing devices specially configured as discussed herein. Some acts are optional and, as such, may be omitted in accord with one or more embodiments. Additionally, the order of acts can be altered, or other acts can be added, without departing from the scope of the systems and methods discussed herein. In addition, as discussed above, in at least one embodiment, the acts are performed on a particular, specially configured machine, namely a constrained computing device configured according to the examples disclosed herein.

Having thus described several aspects of at least one embodiment, it is to be appreciated that various alterations, modifications, and improvements will readily occur to those skilled in the art. For example, the above data model and journaling application may be implemented on PCs and server systems. Such alterations, modifications, and improvements are intended to be part of this disclosure, and are intended to be within the scope of the examples discussed herein. Accordingly, the foregoing description and drawings are by way of example only.

What is claimed is:

1. A constrained computing device comprising:
a memory;
a processor coupled to the memory;
a journaling component executed by the processor in kernel mode and configured to:
   receive information descriptive of a first device control instruction for a device control included in a managed device;
   allocate, in the memory, a variable record structured according to a variable definition associated with the first device control instruction for the device control;
   store the information within the variable record;
   receive updated information descriptive of a second device control instruction for the device control, wherein the updated information is descriptive of a control operation;
   allocate, in the memory, an update record structured according to an update variable definition; and
   store the updated information within the update record; and
a device management component configured to:
   find the update record; and
   issue an instruction to the device control to perform the control operation described in the update record.

2. The constrained computing device according to claim 1, wherein the journaling component is further configured to:
   receive environmental information descriptive of data received via a sensor;
   allocate, in the memory, a sensor variable record structured according to a sensor variable definition associated with the sensor;
   store the environmental information within the sensor variable record;
   receive updated environmental information descriptive of updated data received via the sensor;
   allocate, in the memory, a sensor update record structured according to a sensor update variable definition;
   store the updated environmental information within the sensor update record; and
   link the sensor variable record to the sensor update record.

3. The constrained computing device according to claim 1, wherein the update variable definition includes a metadata variable definition.

4. The constrained computing device according to claim 1, wherein the journaling component is configured to provide an interface to a user mode program.

5. The constrained computing device according to claim 1, wherein the control operation is executable by at least one of an uninterruptible power supply, a power distribution unit, or a rack data access device.

6. The constrained computing device according to claim 1, wherein the journaling component is further configured to store the variable record and the update record in non-volatile data storage.

7. The constrained computing device according to claim 6, wherein the journaling component is further configured to initialize a journal from the variable record and the update record stored in the non-volatile data storage.

8. A method of using a computer-implemented journal to manage device control operation, the method comprising:
receiving, by a computer operating in kernel mode, information descriptive of a first device control instruction for a device control included in a managed device;
allocating, by the computer operating in kernel mode, a variable record structured according to a variable definition associated with the device control instruction;
storing, by the computer operating in kernel mode, the information within the variable record;
receiving, by a computer operating in kernel mode, updated information descriptive of a second device control instruction for the device control, wherein the updated information is descriptive of a control operation;
allocating, by the computer operating in kernel mode, an update record structured according to an update variable definition;
storing, by the computer operating in kernel mode, the updated information within the update record;
finding the update record; and
issuing an instruction to the device control to perform the control operation described in the update record.

9. The method according to claim 8, further comprising:
receiving environmental information descriptive of data received via a sensor;
allocating a sensor variable record structured according to a sensor variable definition associated with the sensor;
storing the environmental information within the sensor variable record;
receiving updated environmental information descriptive of updated data received via the sensor;
allocating a sensor update record structured according to a sensor update variable definition;
storing the updated environmental information within the sensor update record; and
linking the sensor variable record to the sensor update record.

10. The method according to claim 8, wherein allocating the update record includes allocating a metadata record.

11. The method according to claim 8, wherein receiving the information includes receiving the information from a program executing in user mode.

12. The method according to claim 8, wherein receiving the updated information descriptive of the control operation includes receiving updated information that is descriptive of a control operation executable by at least one of an uninterruptible power supply, a power distribution unit, or a rack data access device.

13. The method according to claim 8, further comprising storing the variable record and the update record in non-volatile data storage.

14. The method according to claim 13, further comprising initializing a journal from the variable record and the update record stored in the non-volatile data storage.

15. A non-transitory computer readable medium having stored thereon sequences of instruction for managing device control operation using a journal implemented by a journaling component executing in kernel mode, the sequences of instruction including instructions that will cause at least one processor to:
receive, while operating in kernel mode, information descriptive of a first device control instruction for a device control included in a managed device;
allocate, while operating in kernel mode, a variable record structured according to a variable definition associated with the first device control instruction;
store, while operating in kernel mode, the information within the variable record;
receive, while operating in kernel mode, updated information descriptive of a second device control instruction for the device control, the updated information being descriptive of a control operation;
allocate, while operating in kernel mode, an update record structured according to an update variable definition;
store, while operating in kernel mode, the updated information within the update record;
find, while operating in kernel mode, the update record; and
issue, while operating in kernel mode, an instruction to the device control to perform the control operation described in the update record.

16. The non-transitory computer readable medium according to claim 15, wherein the sequences of instruction include further instructions that will cause the at least one processor to:
receive environmental information descriptive of data received via a sensor;
allocate a sensor variable record structured according to a sensor variable definition associated with the sensor;
store the environmental information within the sensor update record;
receive updated environmental information descriptive of data received via the sensor;
allocate a sensor update record structured according to a sensor update variable definition;
store the updated environmental information within the sensor update record; and
link the sensor variable record to the sensor update record.

17. The non-transitory computer readable medium according to claim 15, wherein the control operation is executable by at least one of an uninterruptible power supply, a power distribution unit, or a rack data access device.

* * * * *